United States Patent Office 3,278,537
Patented Oct. 11, 1966

3,278,537
THIAMINE DERIVATIVES AND THE
PREPARATION THEREOF
Hikoichi Hagiwara, Oyodo-ku, Osaka, Mitsuo Numata,
Nishinomiya, Noboru Shimahara, Suita, and Shojiro
Yurugi, Kamigyo-ku, Kyoto, Japan, assignors to Takeda
Chemical Industries, Ltd., Osaka, Japan
No Drawing. Filed Apr. 29, 1964, Ser. No. 363,613
Claims priority, application Japan, Apr. 28, 1963,
38/22,062; Dec. 13, 1963, 38/4,571; Dec. 26, 1963,
38/70,407
18 Claims. (Cl. 260—256.5)

This invention relates to new disulfide-type thiamine derivatives. More precisely, the present invention relates to alkylene bisthiamine disulfides represented by the general Formula I:

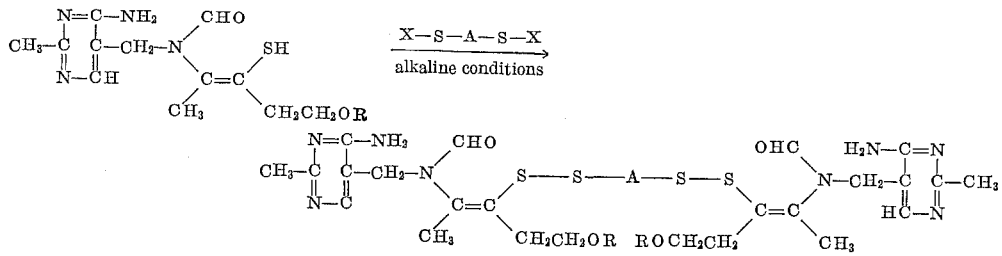

wherein A is an alkylene group containing from 4 to 20 carbon atoms, and R is hydrogen, a carboxylic acid acyl group, a lower alkoxycarbonyl group or phosphono group, and to preparation thereof.

Heretofore, there have been known many kinds of thiamine derivatives which are superior to thiamine acid salts in medicinal effect. Among those thiamine derivatives, thiamine alkyl disulfides, e.g. thiamine propyl disulfide, have been used as the most superior thiamine derivatives in medicinal effect. However, they were not free from deficiencies of unpleasant mercaptan-like odor and bitter taste.

Therefore new more excellent thiamine derivatives free from unpleasant mercaptan-like odor had been sought eagerly by many researchers, and as the result there was found thiamine tetrahydrofurfuryl disulfide which is equivalent to thiamine propyl disulfide in its medicinal effect. However this thiamine tetrahydrofurfuryl disulfide was indeed odorless but has a disadvantage of bitter taste. These unavoidable deficiencies restrict the application of the thiamine derivatives over a wide range in the medical field.

The present inventors have also sought for new thiamine derivatives free from the above-mentioned deficiencies or disadvantages, and now have found new thiamine derivatives of the general Formula I mentioned above, which is no less better than thiamine propyl disulfide or thiamine tetrahydrofurfuryl disulfide in every feature of medicinal effects and what is better, has neither unpleasant odor nor bitter taste.

It is an object of the present invention to provide new thiamine derivatives represented by the general Formula I which are free from the above-mentioned deficiencies, and the medicinal effect of which is superior to that of known thiamine derivatives, not to speak of thiamine acid salts. Another object of the present invention is to provide methods for preparing the new thiamine derivatives. Other objects and advantages will become apparent from the following description.

The thiamine derivatives represented by the general Formula I, i.e. alkylene bisthiamine disulfide and its O-esters, are prepared by allowing thiamine or its O-esters to react with an alkylene dithiol derivatives represented by the Formula II:

$$X-S-A-S-X \qquad (II)$$

wherein A has the same meaning as defined above and X stands for $-SO_3M$, $-SO_2-R'$, $-SO-R'$, $-S-CN$, or a halogen, where M is an alkali metal or univalence of alkaline earth metal and R' is a lower hydrocarbon residue having up to seven carbon atoms. The reaction may be expressed by the following reaction formulas:

More concretely, the alkylene dithiol derivatives shown by the Formula II, one of the reactants, include, for example, alkali metal or alkaline earth metal alkylene bisthiosulfate ($MSO_3-S-A-S-SO_3M$, such as sodium alkylene bisthiosulfate, potassium alkylene bisthiosulfate or calcium alkylene bisthiosulfate), alkylene bisthiosulfonate ($R'SO_2-S-A-S-SO_2R'$, such as alkylene bismethanesulfonate, alkylene bisethanesulfonate or alkylene bisbenzenesulfonate), alkylene bisthiosulfinate $$(R'SO-S-A-S-SOR')$$

such as alkylene bismethanesulfinate, alkylene bisethanesulfinate or alkylene bisbenzenesulfinate), alkylene bisthiothiocyanate ($NC-S-S-A-S-S-CN$), or alkylene bissulfenylhalide (such as alkylene bissulfenyl chloride or alkylene bissulfenyl bromide).

The alkylene group represented by A in said Formulas I and II means in this specification a polymethylene group containing 4 to 20 carbon atoms and preferably 6 to 10, and one or more unsaturated bonds such as double bond may be comprised in the chain of the said alkylene group. Some concrete examples are mentioned as in the following:

Tetramethylene, pentamethylene, hexamethylene, heptamethylene, octamethylene, nonamethylene, decamethylene, dodecamethylene, tetradecamethylene, hexadecamethylene, octadecamethylene, oct-2-enylene, hept-2-enylene, hept-2,4-dienylene, hex-2-enylene.

The reaction of the present invention is carried out in an aqueous medium while maintaining the pH of the reaction system alkalinity, at least at a non-acidic pH. The reagents which are put to use in order to adjust the reaction system alkaline are, for example, inorganic bases such as sodium hydroxide, potassium hydroxide and ammonia, and organic bases such as pyridine and aniline.

As the O-esters of thiamine to be used as one of the starting materials, there may be used in general any of thiamine esters formed with carboxylic acid containing up to seven carbon atoms, with carbonic acid mono-lower alkyl ester containing up to seven carbon atoms, or with phosphoric acid. Preferably, the thiamine esters may, for example, be formic acid ester, acetic acid ester, propionic acid ester, benzoic acid ester, monoethyl carbonic acid ester, monomethyl carbonic acid ester and phosphoric acid ester.

Alternatively, when R in the above-mentioned general Formula I is hydrogen, the compound may be converted into the corresponding O-esters such as formate, acetate, propionate, methoxycarbonate, ethoxycarbonate, benzoate or phosphate, by means of per se known esterification. For the purpose of carrying out the esterification, the esterifying agent may be acid anhydride or acid halide of the carboxylic acid to be introduced. The reaction is preferably carried out in basic organic solvent such as pyridine, dimethylaniline or their mixtures, with or without inert solvent such as dimethylformamide or dioxane. The esterification may also be effected by the use of the desired carboxylic acid and its anhydride with or without dehydrating agent.

The objective compounds of the Formula I are absorbed better from intestines, transferred to the blood and various internal organs at high thiamine level, and the toxicities are very low.

Furthermore, what is better, the compounds show neither unpleasant odor nor bitter taste.

Following are examples illustrating and explaining the actual working of the process of this invention, but they do not restrict the scope of this invention. In all the examples, all temperatures are uncorrected.

EXAMPLE 1

To a solution of 6.7 grams of thiamine chloride hydrochloride in 20 cubic centimeters of water, 25 grams of sodium hydroxide dissolved in 15 cubic centimeters of water was added. After standing for 30 minutes, sodium decamethylene-1,10-bis-thiosulfate was added thereto to give yellow oily substance. The oily substance was extracted with chloroform. The chloroform layer was washed with water and dried, and then chloroform was distilled off. The residue was associated with ethyl acetate and was left standing to separate crystals. Recrystallization from a mixture of methanol and ethylacetate gave 4.5 grams of decamethylene-1,10-bisthiamine disulfide, as colorless powder melting at 139–140° C.

EXAMPLE 2

A solution of 5 grams of sodium thiosulfate in 20 cubic centimeters of water was added to a solution of 2.3 grams of 1,5-pentamethylene dibromide in 20 cubic centimeters of ethanol with stirring under heating to reflux the solvent on water bath. After heating for further 30 minutes, the solvent was removed to give crude crystals of sodium pentamethylene-1,5-bisthiosulfate. To a solution of 6.8 grams of thiamine chloride hydrochloride in 20 cubic centimeters of water, a solution of 2.4 grams of water, a solution of 2.4 grams of sodium hydroxide in 20 cubic centimeters of water was added. The obtained solution was added with stirring to a solution of the above obtained sodium pentamethylene-1,5-bisthiosulfate in 10 cubic centimeters to give yellow oily substance. The oily substance was extracted with chloroform. After the chloroform layer was washed with water and dried, chloroform was evaporated to obtain 4.7 grams of pentamethylene-1,5-bisthiamine disulfide. Upon recrystallization from a mixture of chloroform and ethyl acetate, the crystals melt at 77–79° C.

EXAMPLE 3

A solution of 2.7 grams of 1,8-octamethylene dibromide, 5 grams of sodium thiosulfate in 60 cubic centimeters of 50% aqueous ethanol was stirred under heating at 75° C. on water bath for 30 minutes. Evaporation of the solvent gave sodium octamethylene-1,8-bisthiosulfate.

A solution of 2.5 grams of sodium hydroxide in 15 cubic centimeters of water was added to a solution of 6.7 grams of thiamine chloride hydrochloride in 20 cubic centimeters of water. After the resulting solution was kept standing for 30 minutes, the above obtained sodium octamethylene bisthiosulfate was added thereto to yield yellow oily substance. The oily substance was extracted with chloroform, the chloroform layer was washed with water and dried, chloroform was evaporated to give 5 grams of octamethylene-1,8-bisthiamine disulfide. Upon recrystallization from a mixture of methanol and ethyl acetate, the crystals melt at 133–134° C.

EXAMPLE 4

A mixture of 2.4 grams of 1,6-hexamethylene dibromide and 5 grams of sodium thiosulfate in 40 cubic centimeters of 50% aqueous methanol was stirred under heating at 75° C. on water bath for 30 minutes. Evaporation of the solvent under reduced pressure gave sodium hexamethylene-1,6-bisthiosulfate.

A solution of 2.4 grams of sodium hydroxide in water was added to a solution of 7.4 grams of thiamine chloride hydrochloride in 20 cubic centimeters of water. After standing for 30 minutes, the above-obtained sodium hexamethylene-1,6-bisthiosulfate was added thereto to give yellow oily substance. The oily substance was extracted with chloroform. After the chloroform layer was washed with water and dried, chloroform was evaporated to yield 5.1 grams of hexamethylene-1,6-bisthiamine disulfide. Upon recrystallization from a mixture of chloroform, ethanol and ether, the crystals melt at 132.5–133° C.

EXAMPLE 5

A mixture of 2.5 grams of hept-2-enylene-1,7-dibromide, 5 grams of sodium thiosulfate and 50 cubic centimeters of 50% aqueous methanol was stirred for 30 minutes under heating at 75° C. on water bath. Evaporation of the solvent gave sodium hept-2-enylene-1,7-bisthiosulfate.

A solution of 2.4 grams of sodium hydroxide in 20 cubic centimeters of water was added to a solution of 6.7 grams of thiamine chloride hydrochloride in 20 cubic centimeters of water. After the resultant solution was kept standing for 30 minutes the above-obtained sodium hept-2-enylene-1,7-bisthiosulfate was added thereto to give yellow oily substance. The oily substance was extracted with chloroform. After the chloroform layer was washed with water and dried, chloroform was evaporated to yield 4.3 grams of hept-2-enylene-1,7-bisthiamine disulfide.

EXAMPLE 6

Sodium hexamethylene-1,6-bisthiosulfate was prepared by the reaction of 2.4 grams of 1,6-hexamethylene dibromide with 5 grams of sodium thiosulfate in the same way as in Example 4.

A solution of 2.4 grams of sodium hydroxide in 20 cubic centimeters of water was added to a solution of 7.6 grams of O-acetylthiamine chloride hydrochloride in 20 cubic centimeters of water. After the resultant solution was kept standing for 30 minutes, the above-obtained sodium hexamethylene-1,6-bisthiosulfate in 10 cubic centimeters of water was added thereto to give yellow oily substance. The oily substance was extracted with ethyl acetate. After ethyl acetate layer was washed with water and dried, ethyl acetate was evaporated. The residue was associated with water, and was crystallized to yield 4.7 grams of hexamethylene-1,6-bis(acetylthiamine) disulfide.

Upon recrystallization from ethyl acetate and isopropyl ether, the crystals melt at 106–108° C.

EXAMPLE 7

Sodium hexamethylene-1,6-bisthiosulfate was prepared by the reaction of 1.2 gram of 1,6-hexamethylene dibromide with 2.5 grams of sodium thiosulfate in the same way as in Example 4.

A solution of 5 grams of O-ethoxycarbonylthiamine bromide hydrobromide in 10 cubic centimeters of water under stirring. After the resultant solution was kept standing for 30 minutes, the above-obtained sodium hexamethylene-1,6-bisthiosulfate in 10 cubic centimeters of water was added thereto to give yellow oily substance. Thereafter the oily substance was treated in the same way as in the preceding examples to obtain 1.2 gram of hexamethylene - 1,6 - bis(ethoxycarbonylthiamine) disulfide melting at 77–80° C.

EXAMPLE 8

A solution of 2.4 grams of sodium hydroxide in 20 cubic centimeters of water was added to a solution of 7.9 grams of O-propionoylthiamine chloride hydrochloride in 20 cubic centimeters. After the resulting solution was kept standing for 30 minutes, sodium hexamethylene-1,6-bisthiosulfate prepared in the same way as in Example 4 in 20 cubic centimeters of water was added to the above-obtained solution under stirring to give yellow oily substance. The oily substance was treated in the same way as in the preceding examples to yield 4.5 grams of hexamethylene-1,6-bis(propionylthiamine) disulfide melting at 100–102° C.

EXAMPLE 9

Sodium hexamethylene-1,6-bisthiosulfate was prepared by the reaction of 2.4 grams of 1,6-hexamethylene dibromide with 5 grams of sodium thiosulfate in the same way as in Example 4.

A solution of 2.4 grams of sodium hydroxide in 20 cubic centimeters of water was added to a solution of 10.6 grams of O-benzoylthiamine bromohydrobromide in 20 cubic centimeters of water. After the resultant solution was kept standing for 30 minutes, a solution of the above-obtained sodium hexamethylene-1,6-bisthiosulfate in 20 cubic centimeters of water was added thereto to give yellow oily substance. Thereafter the oily substance was treated in the same way as in the preceding examples to obtain 3.5 grams of hexamethylene-1,6-bis(benzoylthiamine) disulfide as colorless powder melting at 132–133° C.

EXAMPLE 10

Sodium octamethylene-1,8-bisthiosulfate was prepared by the reaction of 1.3 gram of 1,8-octamethylene dibromide with 2.5 grams of sodium thiosulfate in the same way as in Example 3.

A solution of 1.3 gram of sodium hydroxide in 10 cubic centimeters of water was added to a solution of 5.0 grams of O-ethoxycarbonylthiamine bromide hydrobromide in 10 cubic centimeters of water. After the resultant solution was kept standing for 30 minutes, a solution of the above-obtained sodium octmethylene-1,8-bisthiosulfate in 20 cubic centimeters of water was added thereto to give yellow oily substance. Thereafter the oily substance was treated in the same way as in the preceding examples to obtain 2.7 grams of octamethylene-1,8-bis(ethyoxycarbonylthiamine) disulfide melting at 65–67° C.

EXAMPLE 11

Sodium octamethylene-1,8-bisthiosulfate was prepared by the reaction of 2.7 grams of 1,8-octamethylene dibromide with 5.0 grams of sodium thiosulfate in the same way as in Example 3.

A solution of 2.5 grams of sodium hydroxide in 20 cubic centimeters of water was added to a solution of 7.6 grams of O-acetylthiamine chloride hydrochloride in 20 cubic centimeters of water. After the resultant solution was kept standing for 30 minutes, a solution of the above-obtained sodium octamethylene-1,8-bisthiosulfate in 40 cubic centimeters of water was added thereto to give yellow oily substance. Thereafter the oily substance was treated in the same way as in the preceding examples to obtain 6.5 grams of octamethylene-1,8-bisacetylthiamine disulfide melting at 101–103° C.

EXAMPLE 12

Sodium octamethylene-1,8-bisthiosulfate was prepared by the reaction of 2.7 grams of 1,8-octamethylene dibromide with 5 grams of sodium thiosulfate in the same way as in Example 3.

A solution of 2.5 grams of sodium hydroxide in 20 cubic centimeters of water was added to a solution of 8 grams of O-propionoylthiamine chloride hydrochloride in 20 cubic centimeters of water. After the resultant solution was kept standing for 30 minutes, a solution of the above-obtained sodium octamethylene-1,8-bisthiosulfate in 40 cubic centimeters of water was added thereto to give yellow oily substance. Thereafter the oily substance was treated in the same way as in the preceding examples to obtain 7.2 grams of octamethylene-1,8-bis(propionoylthiamine) disulfide melting at 103–106° C.

EXAMPLE 13

Sodium octamethylene-1,8-bisthiosulfate was prepared by the reaction of 1.3 gram of 1,8-octamethylene dibromide with 2.5 grams of sodium thiosulfate in the same way as in Example 3.

A solution of 1.3 gram of sodium hydroxide in 20 cubic centimeters of water was added to a solution of 5.3 grams of O-benzoylthiamine bromide hydrobromide in 15 cubic centimeters of water. After the resultant solution was kept standing for 30 minutes, a solution of the above-obtained sodium octamethylene-1,8-bisthiosulfate in 20 cubic centimeters of water was added thereto to give yellow oily substance. Thereafter the oily substance was treated in the same way as in the preceding examples to obtain 3.2 grams of octamethylene-1,8-bis(benzoylthiamine) disulfide melting at 105–107° C.

Example 14

Sodium decamethylene-1,10-bisthiosulfate was prepared by the reaction of 3 grams of 1,10-decamethylene dibromide with 5 grams of sodium thiosulfate in the same way as in Example 1.

To a solution of 7.6 grams of O-acetylthiamine chloride hydrochloride in 20 cubic centimeters of water, a solution of 2.5 grams of sodium hydroxide in 20 cubic centimeters of water was added. After the resultant solution was kept standing for 30 minutes, a solution of the above-obtained sodium decamethylene-1,10-bisthiosulfate in 50 cubic centimeters of water was added thereto to give yellow oily substance. Thereafter the oily substance was treated in the same way as in the preceding examples to obtain 5.8 grams of decamethylene-1,10-bis(acetylthiamine) disulfide as colorless crystals melting at 97–99° C.

Example 15

Sodium oct-2-enylene-1,8-bisthiosulfate was prepared by the reaction of 4 grams of oct-2-enylene-1,8-dibromide with 7.3 grams of sodium thiosulfate in the same way as in Example 1.

A solution of 3.6 grams of sodium hydroxide in 26 cubic centimeters was added to a solution of 10 grams of thiamine chloride hydrochloride in 20 cubic centimeters of water. After the resultant solution was kept standing for 30 minutes, a solution of the above-obtained sodium oct-2-enylene-1,8-bisthiosulfate in 30 cubic centimeters of water was added thereto to give oily substance. Thereafter the oily substance was treated in the same way as in the preceding examples to obtain 5.5 grams of oct-2-enylene-1,8-bisthiamine disulfide melting at 127–132° C.

Example 16

To a solution of 5 grams of octamethylene-1,8-bis-thiamine disulfide in 50 cubic centimeters of formic acid, 11 grams of phosphorus pentoxide was dropwise added while the solution was stirred under cooling with ice. After the reaction mixture was kept standing overnight, formic acid was distilled off under reduced pressure. The residual oil was poured into ice water, and then aqueous mixture was alkalified with potassium carbonate give an oily substance.

The resulting oil was extracted with ethyl acetate, and the ethyl acetate layer was washed with water and dried. Then, the solvent was evaporated. Ether was added to the obtained residual oil, and the solution was kept standing under cooling overnight to give 3 grams of octamethylene-1,8-bis-formylthiamine disulfide as colorless crystals. Recrystallization from a mixture of ethyl acetate and ether yielded crystals melting at 92–95° C.

Example 17

To a solution of 36.9 grams of octamethylene-1,8-bisthiamine disulfide in 500 grams of pyridine, 10.2 grams of acetic anhydride was dropwise added under cooling. After the resulting reaction mixture was kept standing overnight, pyridine was evaporated under reduced pressure. The obtained residual oily substance was extracted with ethyl acetate. After the ethyl acetate layer was washed with 10% aqueous sodium hydrogen carbonate solution and then water and dried, the solvent was evaporated and then ether was added to the residue to give 35 grams of octamethylene-1,8-bis(acetylthiamine) disulfide melting at 101–103° C.

Example 18

To a solution of 11.1 grams of octamethylene-1,8-bisthiamine disulfide in 200 grams of pyridine, 9 grams of benzoyl chloride was dropwise added under cooling. After the resulting reaction mixture was kept standing overnight, pyridine was evaporated under reduced pressure. Thereafter the obtained oily substance was treated in the same way as in Example 17 to give 10 grams of octamethylene-1,8-bis(benzoylthiamine) disulfide melting at 105–107° C.

Having thus disclosed the invention, what is claimed is:

1. Compound of the formula

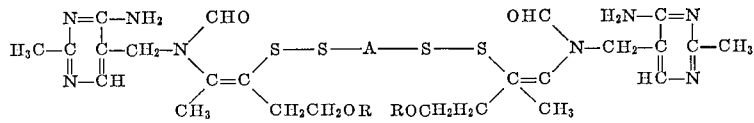

wherein R is a member selected from the group consisting of hydrogen, lower alkanoyl, having up to 7 carbon atoms, benzoyl, lower alkoxycarbonyl having up to 7 carbon atoms, and phosphono, and A is a member selected from the group consisting of alkylene having 4 to 20 carbon atoms and alkenylene having from 4 to 20 carbon atoms.

2. Compound of the formula

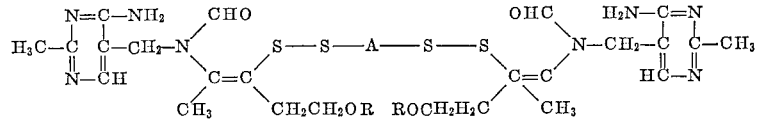

wherein R is a member selected from the group consisting of formyl, acetyl, propionyl, benzoyl and phosphono, and A is a member selected from the group consisting of alkylene having 6 to 10 carbon atoms and alkenylene having 6 to 10 carbon atoms.

3. Pentamethylene bisthiamine disulfide.
4. Hexamethylene bisthiamine disulfide.
5. Hexamethylene bis(acetylthiamine) disulfide.
6. Hexamethylene bis(ethoxycarbonylthiamine) disulfide.
7. Hexamethylene bis(propionoylthiamine) disulfide.
8. Hexamethylene bis(benzoylthiamine) disulfide.
9. Hept-2-enylene bisthiamine disulfide.
10. Octamethylene bisthiamine disulfide.
11. Octamethylene bis(formylthiamine) disulfide.
12. Octamethylene bis(acetylthiamine) disulfide.
13. Oct-2-enylene bisthiamine disulfide.
14. Octamethylene bis(ethoxycarbonylthiamine) disulfide.
15. Octamethylene bis(propionoylthiamine) disulfide.
16. Octamethylene bis(benzoylthiamine) disulfide.
17. Decamethylene bisthiamine disulfide.
18. Decamethylene bis(acetylthiamine) disulfide.

References Cited by the Examiner

UNITED STATES PATENTS 3,016,380  1/1962  Yurugi et al. _____ 260—256.5

FOREIGN PATENTS 314,363  4/1963  Japan.

ALEX MAZEL, *Primary Examiner.*

HENRY R. JILES, MARY O'BRIEN,
*Assistant Examiners.*